United States Patent [19]

Sherman

[11] Patent Number: 5,059,907

[45] Date of Patent: Oct. 22, 1991

[54] METHOD FOR EVALUATING THE WATER SATURATION OF SUBTERRANEAN FORMATIONS FROM DIELECTRIC PERMITTIVITY MEASUREMENTS

[75] Inventor: Michael M. Sherman, Broken Arrow, Okla.

[73] Assignee: Amoco Corporation, Chicago, Ill.

[21] Appl. No.: 520,162

[22] Filed: Apr. 27, 1990

Related U.S. Application Data

[63] Continuation of Ser. No. 240,985, Sep. 6, 1988, abandoned.

[51] Int. Cl.⁵ .......................... G01V 3/38; G01V 3/18
[52] U.S. Cl. .................................... 324/323; 324/341; 324/376; 73/152
[58] Field of Search ............... 324/323, 333, 338, 341, 324/376; 364/422; 73/151, 152, 153

[56] References Cited

U.S. PATENT DOCUMENTS

4,786,873  11/1988  Sherman .............................. 324/323

Primary Examiner—Walter E. Snow

[57] ABSTRACT

Two types of dielectric logging tools are in use: the pad type which operates in the 100 to 1100 MHz frequency range and the mandrel type, which typically operates in the 10 to 100 MHz range. Although both types of tools make the same measurement, the lower frequency tools have a greater depth of investigation and therefore have different applications than the higher frequency pad device. However, logs measured with 10 to 100 MHz tools are more difficult to interpret because of the large frequency-dependent dispersion of the dielectric permittivity below 100 MHz. A model of the frequency dependence of the dielectric permittivity has now been developed that predicts permittivities in the 10 to 100 MHz range from the more easily obtained measurements in the 100 to 1300 MHz range. The predicted permittivities are used to calculate fit parameters for interpretation equations normally used for the higher frequency pad devices. Once these fit parameters are known for measurements in the 10 to 100 MHz range, then the high frequency interpretation methods can be applied in the 10 to 100 MHz range. Thus, by combining the model for the frequency dependence of the dielectric permittivity with existing interpretation methods used for 100 to 1100 mHz tools, an improved interpretation of dielectric logging measurements in the 10 to 100 MHz range is possible.

9 Claims, 6 Drawing Sheets

.—Model fit of dielectric constant, $\epsilon'(\omega)$, for Weber sandstone sample #1. $S_w = 100\%$, $C_w = 7.25 S/M$, Porosity=12.9%

Fig. 1.—Model fit of dielectric constant, $\varepsilon'(\omega)$, for Weber sandstone sample #1. $S_w$=100%, $C_w$=7.25S/M, Porosity=12.9%

Fig. 2.—Model fit of conductivity for Weber sandstone sample #1. $S_w = 100\%$, $C_w = 7.25 S/M$, Porosity = 12.9%

Fig. 3. Medium induction, neutron porosity, and gamma ray curves for Weber formation.

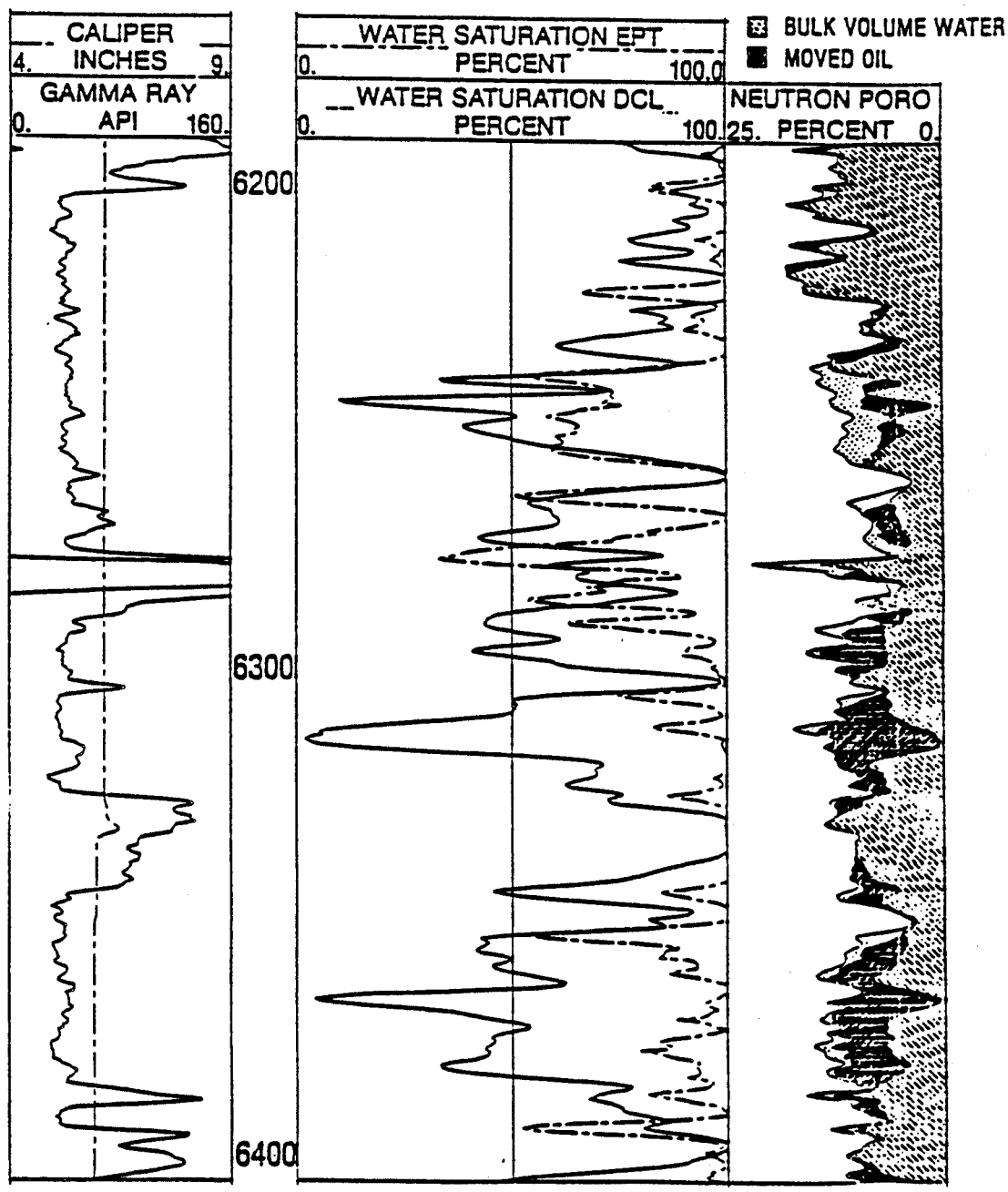
Fig. 5. Comparison of Water saturations calculated from the EPT and DCL with calculated bulk volume of oil and water. Black shading represents moved oil.

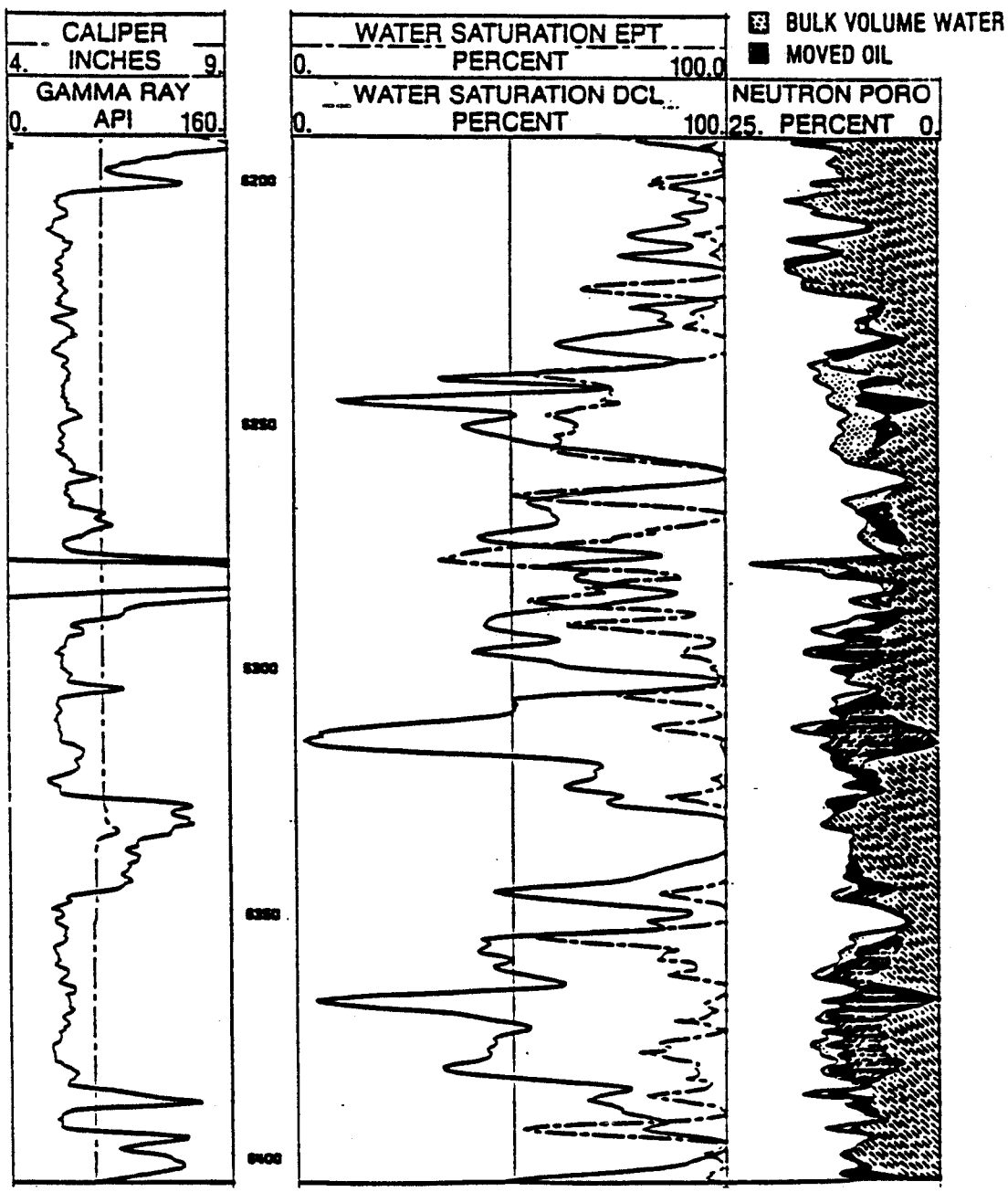
Fig. 6. Comparison of Water saturations calculated from the EPT and DCL with calculated bulk volume of oil and water. Black shading represents moved oil.

METHOD FOR EVALUATING THE WATER SATURATION OF SUBTERRANEAN FORMATIONS FROM DIELECTRIC PERMITTIVITY MEASUREMENTS

This is a continuation of copending application Ser. No. 07/240,985 filed on Sep. 6, 1988, now abandoned.

BACKGROUND OF THE INVENTION

1. Field of the Invention

This invention pertains to dielectric logging measures made on a subterranean formation and, more specifically, to a method for calibrating dielectric permittivity data taken with logging tools in a frequency range of from about 10 to about 100 MHz.

2. Technical Background

Current logging tools that measure the dielectric permittivity of reservoir formations normally operate over a wide range in signal frequency from 16 MHz to 1100 MHz. The permittivity measurements from these tools are used to determine the water and oil saturations of reservoir formations. However, the dielectric permittivity of a formation changes with the signal frequency so that an equation that correctly predicts the water and, hence, oil saturation from the formation dielectric permittivity at one frequency may predict incorrect values at other frequencies.

One method, based on the Hanai-Bruggeman equation, has been developed which uses the same algebraic expression to relate the dielectric permittivity to water saturation. The method is set forth in my earlier patent application Ser. No. 871,730, filed June 6, 1986, now U.S. Pat. No. 4,786,873 and entitled "Improved Method for Evaluating Water Saturation in Petroleum Reservoirs from Dielectric Permittivity." The disclosure in Ser. No. 871,730, now U.S. Pat. No. 4,786,873 is incorporated herein by reference. The method has adjustable parameters to compensate for the frequency dependence of the permittivity. The adjustable parameters are determined from laboratory measurements taken from core samples. However, laboratory measurements of the dielectric permittivity below 100 MHz are often inaccurate because of limitations in laboratory techniques.

SUMMARY OF THE INVENTION

A new method has now been developed of predicting the value of the dielectric permittivity and for calibrating dielectric log measurements made on subterranean formations at frequencies below 100 MHz from measurements taken on core samples at frequencies between 100 MHz and 1300 MHz. The predicted values of the permittivity are then used to determine the calibration parameters for the Hanai-Bruggeman based water saturation calculations at frequencies below 100 MHz. This allows the same interpretation technique to be applied over the entire range of frequencies used by conventional dielectric logging tools. Because the depth of signal penetration of a dielectric tool is controlled by its signal frequency, the water saturation at various distances from the wellbore can be determined by using different dielectric tools. This is important in determining how much moveable oil is in the reservoir.

By using the same interpretation technique over the frequency range, measurements at different frequencies can be compared and the differences in the calculated water saturations represent differences in the saturations due to the flushing action of the drilling fluid and not differences due to different interpretation techniques.

The novel method for calibrating dielectric log measurements made on a subterranean formation comprises the steps of:

(a) measuring the dielectric permittivity of a core sample from said formation at a plurality of frequencies (greater than about 100 MHz) in a first frequency range;

(b) developing a math model of dielectric permittivity as a function of frequency that statistically fits the dielectric permittivity data obtained in step (a) and estimates the dielectric permittivity of the formation;

(c) calculating the dielectric permittivity of the formation at a frequency (less than about 100 MHz) in a lower second frequency range;

(d) calculating the depolarization factor, L, and the functional formation parameter, k, for the formation using the equation $$S_w^k = \frac{\left(\frac{\epsilon^* - \epsilon_m}{\epsilon_w^* - \epsilon_m}\right)\left(\frac{\epsilon_w^*}{\epsilon^*}\right)^L}{\phi_t}$$

wherein:

$S_w$ = water saturations $\epsilon^*$ = dielectric permittivity of the formation from step (c)

$\epsilon_m$ = dielectric permittivity of the rock matrix from laboratory measurements on the core sample $\epsilon_w^*$ = dielectric permittivity of saturating brine in the core sample $\phi_t$ = total porosity, from laboratory measurements on the core sample;

(e) obtaining the dielectric permittivity of the formation, $\epsilon^*$, using a logging tool operating at a frequency in said second frequency range; and (f) determining the water saturation of the formation, $S_w$ (formation), by using the equation $$S_w^k \text{ (formation)} = \frac{\left(\frac{\epsilon^* - \epsilon_m}{\epsilon_w^* - \epsilon_m}\right)\left(\frac{\epsilon_w^*}{\epsilon^*}\right)^L}{\phi_t}.$$

BRIEF DESCRIPTION OF THE DRAWINGS

FIGS. 5 and 6 show water saturation determined from dielectric log measurements made at 47 and 1100 MHz and moveable oil for the Weber formation.

DETAILED DESCRIPTION OF THE INVENTION

Figure 1:
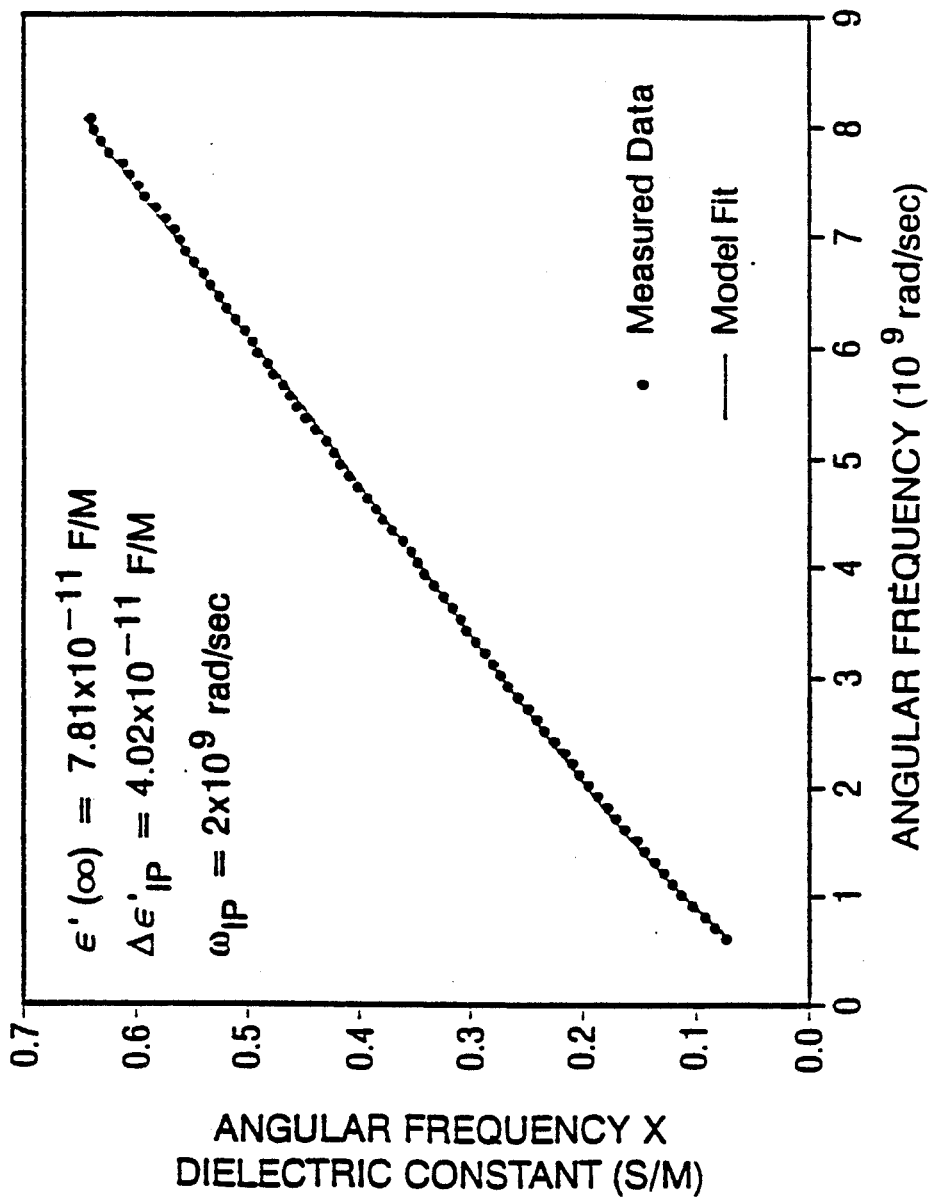
FIG. 1 shows the relationship of dielectric constant to frequency for a sample of Weber sandstone.

The model for the frequency dependence of the dielectric permittivity, $\epsilon^*(\omega)$, assumes a frequency dependent dielectric constant, $\epsilon(\omega)$, and a frequency independent conductivity, $\sigma$. The dielectric constant is expressed as a complex number, $$\epsilon(\omega)=\epsilon'(\omega)+i\epsilon''(\omega), \quad (1)$$

and, when combined through Maxwell's equations with the conductivity, results in a complex dielectric permittivity $$\epsilon^*(\omega)=\epsilon'(\omega)+i(\epsilon''(\omega)+\sigma/\omega). \quad (2)$$

The real and imaginary parts of the permittivity can be modeled by $$Re\epsilon^*(\omega) = \epsilon'(\infty) + \frac{\Delta\epsilon'_{IP}}{1+(\omega/\omega_{IP})^2} + \frac{\Delta\epsilon'_{DP}}{1+(\omega/\omega_{DP})^2} \quad (3)$$

$$Im\epsilon^*(\omega) = \sigma/\omega + \frac{\Delta\epsilon'_{IP}}{1+(\omega/\omega_{IP})^2} + \frac{\Delta\epsilon'_{DP}}{1+(\omega/\omega_{DP})^2}. \quad (4)$$

Where $\Delta\epsilon'_{IP}$, $\Delta\epsilon'_{DP}$, $\omega_{IP}$, $\omega_{DP}$, $\epsilon'(\infty)$, and $\sigma$ are regression coefficients determined by a least squares regression of Eqs. (3) and (4) on laboratory data. For brine saturated samples, Eq. (3) can be truncated by removing the last term, while the last term in Eq. (4) is replaced by a constant, $\epsilon''(\infty)$. Once the regression coefficients are determined, then Eqs. (3) and (4) can be extrapolated to any frequency, $\omega$, below 100 MHz.

Extrapolated values for $Re\epsilon^*(\omega)$ and $Im\epsilon^*(\omega)$ are used in the Hanai-Bruggeman equation, $$\phi_c = \left(\frac{\epsilon^*(\omega)-\epsilon_m}{\epsilon_w^*-\epsilon_m}\right)\left(\frac{\epsilon_w^*}{\epsilon^*(\omega)}\right)^L. \quad (5)$$

along with the known or laboratory determined parameters of $\epsilon_w^*$, $\epsilon_m$, and $\phi_c$, to determine the frequency-dependent depolarization factor L.

The water saturation, Sw, is determined by relating the ratio of the apparent water filled porosity, $\phi_c$, to the total porosity, $\phi_t$, using another exponent, k, and the relationship $$S_w^k=\phi_c/\phi_t. \quad (6)$$

The exponent k can be determined by two methods. One method estimates k using the relationship $$k=(1-L)n. \quad (7)$$

Where n is the saturation exponent in Archie's water saturation equation as determined from measurements on core samples using standard laboratory techniques. The second method uses measurements of the dielectric permittivity on core samples partially water saturated. The permittivity measurements are made between 100 and 1300 MHz and the frequency model is used to extrapolate those measurements to the desired frequency. The apparent water filled porosity is then calculated using Eq. (5) and Eq. (6) is solved for k. The values of the water saturation and the total porosity are determined by standard laboratory techniques. With k determined for a given frequency, Eqs. (5) and (6) are used to convert log measured permittivities to water saturation. The total porosity from a neutron or other porosity log is used for $\phi_t$.

Both the concept and the method of extrapolating laboratory dielectric permittivity measurements to other frequencies in order to calibrate an interpretation equation is new to dielectric log analysis. The method allows the use of the same interpretation method for a wide range of frequencies and reduces the error in calculated water saturations between two tools by reducing the effect of using two different analysis methods as previously practiced. Furthermore, the frequency model provides a way to interpret dielectric tools operating below 100 MHz in formations containing saline water. Previously, these tools could only be interpreted when logging in formations containing very low salinity water.

EXPERIMENTAL RESULTS

Laboratory Measurements

Seven plugs from a cored well in the Weber formation in Colorado, U.S.A., were saturated with NaCl brine having a resistivity of 0.138 $\Omega$m. The dielectric permittivity of each plug was determined at 75 frequencies between 96 MHz and 1300 MHz from 's' parameter measurements using a HP 8505 network analyzer. The coefficients in Eqs. (8) and (9) were then determined from the permittivity data by linear least squares regression.

$$R_e \epsilon^*(\omega) = \epsilon'(\infty) + \frac{\Delta\epsilon'_{IP}}{1+\left(\frac{\omega}{\omega_{IP}}\right)^2} \quad (8)$$

$$I_m \epsilon^*(\omega) = \frac{\sigma}{\omega} + \frac{\Delta\epsilon'_{IP}}{1+\left(\frac{\omega}{\omega_{IP}}\right)^2} + \epsilon''(\infty) \quad (9)$$

Figure 2:
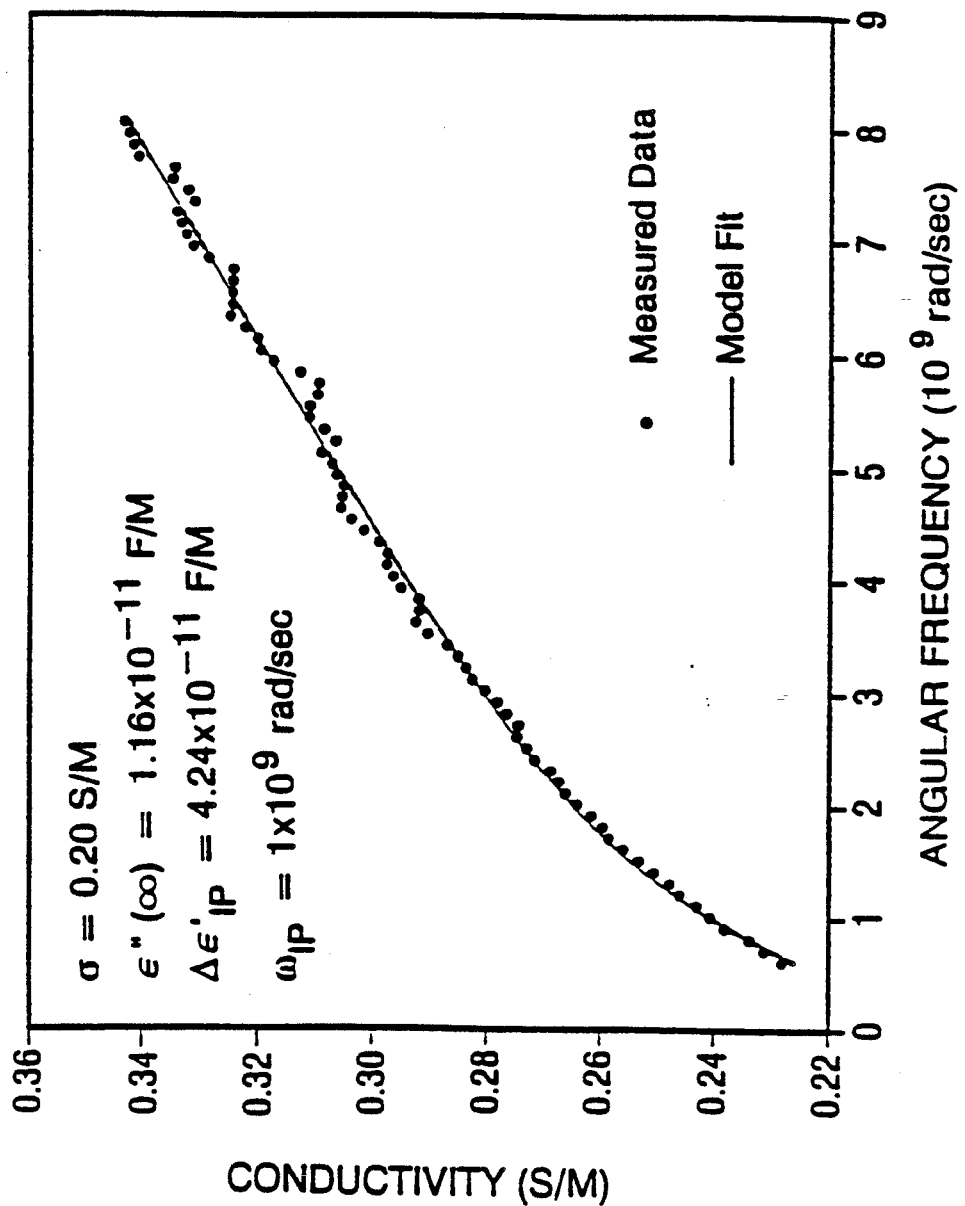
FIG. 2 shows the relationship of conductivity to frequency for a sample of Weber sandstone.

FIGS. 1 and 2 illustrate the results of the regression on the data. In the figures, the frequency is expressed in radians/second ($2\pi \times$ frequency) since frequency appears in equations (8) and (9) in this form.

The regression coefficients for all seven samples are summarized in Tables 1 and 2. Eqs. (8) and (9) were used to predict the permittivity values for the samples at 47 MHz from which L was calculated using Eq. (2). Table 3 summarizes the predicted permittivity and L values at 47 MHz. With L determined, k was estimated using Eq. (7) with a value of 1.5 for n as measured in the Weber formation by Neuman. The k values are also summarized in Table 3.

Logging Measurements

Figure 3:
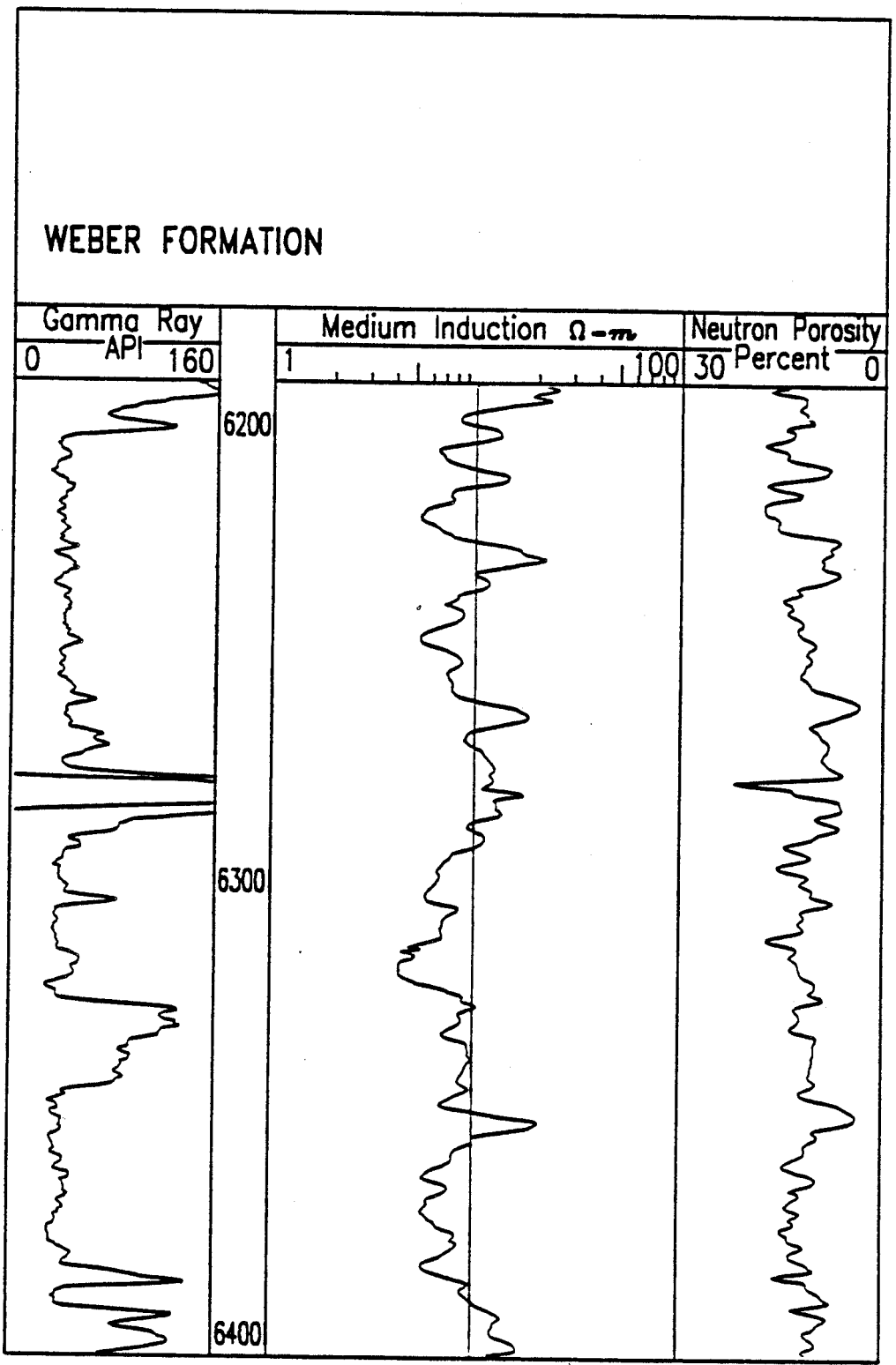
FIG. 3 shows medium induction, neutron porosity, and gamma ray curves for the Weber formation.

A conventional induction resistivity log and a neutron porosity log were used to log the cored well in the Weber formation. In FIG. 3, the medium induction curve and the neutron porosity are presented. In addition, two dielectric tools, the Schlumberger Electromagnetic Propagation Tool (EPT), operating at 1100 MHz, and the Western-Atlas Dielectric Constant Log (DCL), operating at 47 MHz, were used to measure the dielectric permittivity of the Weber formation. Because of differences in operating frequency, the EPT and DCL have different depths of investigation. Skin depth, $$\delta=(2/\sigma\omega\mu)^{\frac{1}{2}}, \quad (10)$$

is an indication of the depth of penetration of an electromagnetic wave into a material having conductivity $\sigma$, magnetic permeability $\mu$, and angular frequency $\omega$. For the same conductivity and magnetic permeability the DCL will have a depth of penetration 4.84 times that of the EPT. In reservoir rocks, the difference in the depths of penetration will be even greater because the conductivity of brine saturated rocks increases with frequency. Because of the large difference in depth of penetration, it is assumed that the EPT measures the flushed zone permittivity, while the DCL measures a partially invaded formation. Thus, for EPT interpretation, the water resistivity must be that of the mud filtrate (Rmf=0.9 $\Omega$-m); while for the DCL, the water resistivity, $R_w$, was estimated from the porosity and resistivity logs to be 0.3 $\Omega$-m. Based on the above analysis, the water relative permittivity values for the EPT are $\epsilon_\omega'=63$ and $\epsilon_\omega''=18.2$ and $\epsilon_\omega'=53$ and $\epsilon_\omega''=1275$ for the DCL at a reservoir temperature of 70° C.

Figure 4:
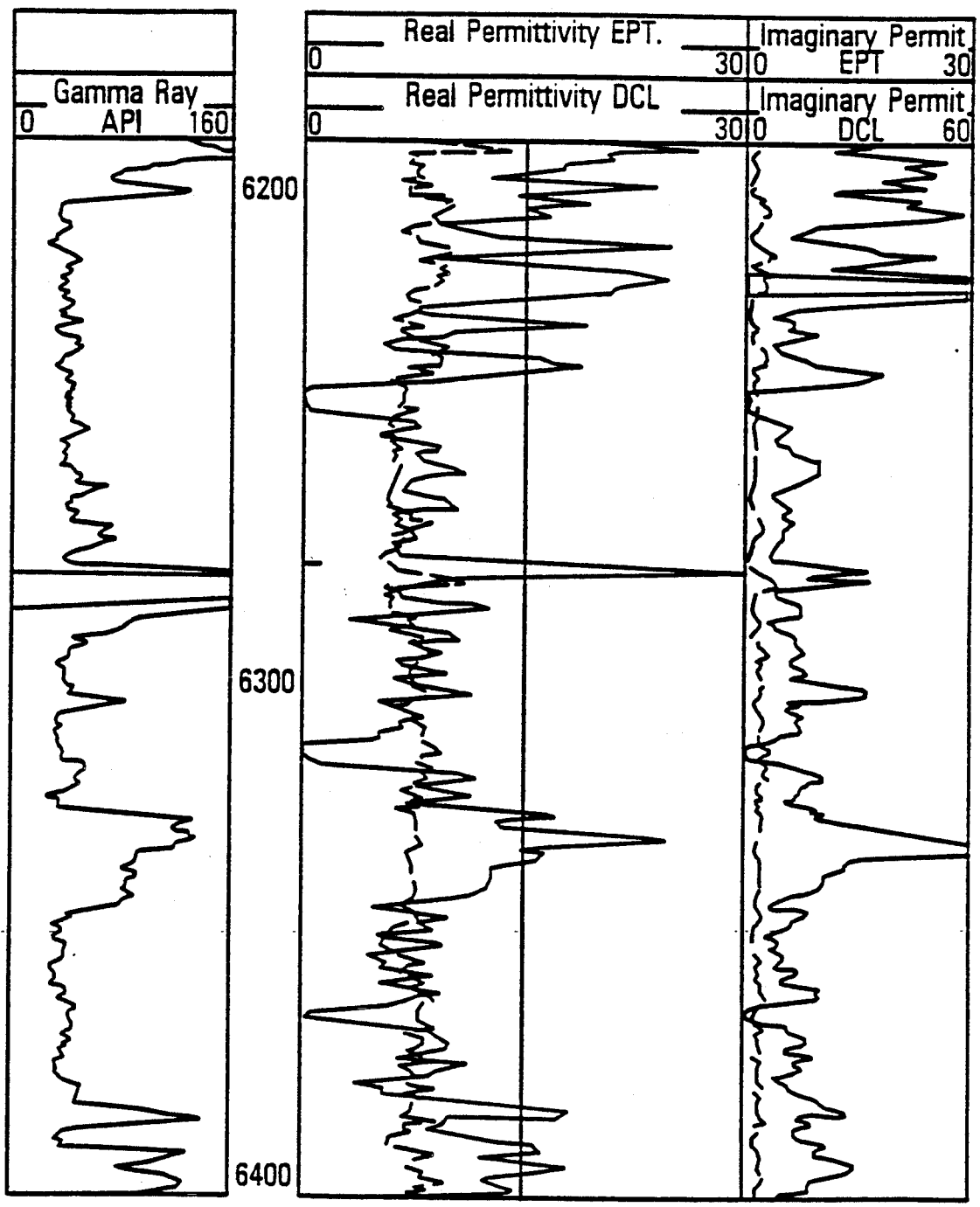
FIG. 4 shows the real and imaginary parts of dielectric permittivity measured at 47 and 1100 MHz and gamma ray curves for the Weber formation.

Shown in FIG. 4 are the real and imaginary parts of the dielectric permittivities as measured by the EPT and the DCL. Note the differences between the tools, with the lower frequency DCL generally reading higher permittivity values than the EPT. This is the expected outcome of measuring the permittivity at two frequencies and is consistent with laboratory measurements and theory.

By using Eq. (5) combined with the average value of L obtained from laboratory measurements and the frequency model, the apparent water-filled porosity, $\phi_c$, can be calculated for each tool. FIG. 5 shows the apparent water-filled porosity for the Weber sandstone calculated from both the DCL and the EPT. The porosity from the EPT is typically higher than that from the DCL. This is reasonable since the EPT reads nearer to the wellbore and, therefore, should measure the permittivity of a zone flushed by the drilling fluid. On the other hand, the DCL reads deeper into the formation where flushing has less of an effect and more oil should be present.

The water saturation was calculated by using Eq. (6) with the results displayed in FIG. 6. The total porosity has been assumed to be the neutron porosity in FIG. 3. The far right track of FIG. 6 shows the bulk volume of water and oil with the black shading representing the volume of oil moved by the flushing action of the mud filtrate. The moved oil is determined by the difference in the calculated water saturations from the EPT and the DCL. Each of the three major sands, delineated by the gamma ray curve in the left-hand track of FIG. 6, The log calculations indicate the presence of hydrocarbon in these zones and also indicate that parts of those three horizons are water saturated such as the one between 6202′ and 6240′.

From three basic logs, the EPT, DCL and a Compensated Neutron Log (CNL) for total porosity, a determination of total oil, moveable oil, and water saturation has been made for the Weber sandstone. More importantly, the same interpretation algorithm was used for both dielectric logs and should reflect actual differences in the formation saturations rather than differences in interpretation techniques.

| NOMENCLATURE | |
|---|---|
| f | = Frequency in Hertz |
| i | = $\sqrt{-1}$ |
| m | = Cementation exponent in Archies' formation factor-porosity equation |
| n | = Saturation exponent in Archies' water saturation equation |
| $S_w$ | = Water saturation |
| $E_m$ | = Dielectric permittivity of rock matrix |
| $\epsilon^*_w$ | = Dielectric permittivity of saturating brine |
| $\epsilon(\omega)$ | = Frequency dependent dielectric constant $\epsilon'(\omega) + i\epsilon''(\omega)$ |
| $\epsilon^*(\omega)$ | = Frequency dependent, complex dielectric permittivity $\epsilon(\omega) + i\sigma(\omega)/\omega$. |
| $Re\epsilon^*(\omega)$ | = Real part of frequency dependent dielectric permittivity |
| $Im\epsilon^*(\omega)$ | = Imaginary part of frequency dependent dielectric permittivity |
| $\epsilon'(\infty)$ | = Real part of dielectric permittivity at infinite frequency |
| $\Delta\epsilon'_{IP}$ | = Change in real part of dielectric permittivity due to interfacial relaxation or dipole relaxation |
| $\phi_c$ | = Porosity calculated from Hanai-Bruggeman |
| $\phi_t$ | = Total porosity |
| $\sigma$ | = Frequency independent D.C. conductivity |
| $\sigma(\omega)$ | = Frequency dependent conductivity $\sigma'(\omega) - i\sigma''(\omega)$ |
| $\omega$ | = Angular frequency in radians/second ($2\pi f$) |
| $\omega_{IP}$ | = Characteristic angular frequency for interfacial polarization relaxation or dipole relaxation |

TABLE 1

FREQUENCY MODEL PARAMETERS FOR REAL PART OF DIELECTRIC PERMITTIVITY, $Re\epsilon^*(\omega)$, $R_w = 0.138\Omega$-m.

| Sample No. | Porosity | $\epsilon'(\infty)(\times 10^{-11})$F/M | $\Delta\epsilon' (\times 10^{-11})$F/M IP | $\omega (\times 10^{-9})$rad/sec IP |
|---|---|---|---|---|
| 1 | .129 | 7.81 | 4.02 | 2.00 |
| 3 | .136 | 7.66 | 3.54 | 2.37 |
| 4 | .071 | 6.10 | 2.45 | 2.23 |
| 5 | .147 | 8.17 | 4.38 | 2.32 |
| 6 | .144 | 8.19 | 3.90 | 2.35 |
| 7 | .114 | 7.81 | 2.78 | 2.48 |
| 8 | .086 | 6.34 | 2.09 | 2.45 | are known producing horizons in the Weber sandstone.

TABLE 2

FREQUENCY MODEL PARAMETERS FOR IMAGINARY PART OF DIELECTRIC PERMITTIVITY, $Im\epsilon^*(\omega)$. $R_w = 0.138\Omega$-m

| Sample No. | Conductivity $\sigma$ S/M | $\epsilon''(\infty)(\times 10^{-11})$F/M | $\Delta\epsilon' (\times 10^{-11})$F/M IP | $\omega (\times 10^9)$rad/sec IP |
|---|---|---|---|---|
| 1 | .207 | 1.16 | 4.24 | 1.0 |
| 3 | .181 | 1.31 | 4.18 | 1.0 |

TABLE 2-continued

FREQUENCY MODEL PARAMETERS FOR IMAGINARY PART OF DIELECTRIC PERMITTIVITY, $\text{Im}\epsilon^*(\omega)$. $R_w = 0.138\Omega\text{-m}$

| Sample No. | Conductivity $\sigma$ S/M | $\epsilon''(\infty)(\times 10^{-11})$F/M | $\Delta\epsilon'\ (\times 10^{-11})$F/M IP | $\omega\ (\times 10^9)$rad/sec IP |
|---|---|---|---|---|
| 4 | .066 | 0.71 | 2.22 | 1.2 |
| 5 | .193 | 1.81 | 3.79 | 1.2 |
| 6 | .231 | 1.44 | 4.40 | 1.2 |
| 7 | .182 | 1.15 | 3.01 | 1.2 |
| 8 | .072 | 0.68 | 3.01 | 1.2 |

TABLE 3

VALUE OF DIELECTRIC PERMITTIVITY DEPOLARIZATION CONSTANT, L, AND k EXPONENT AT 47 MHz DETERMINED FROM FREQUENCY MODEL AND HANAI-BRUGGEMANN EQUATION

| Sample No. | Porosity | $\text{Re}\epsilon^*(47)(\epsilon/\epsilon_0)$ | $\text{Im}\epsilon^*(47)(\epsilon/\epsilon_0)$ | L | k |
|---|---|---|---|---|---|
| 1 | .129 | 13.27 | 81.82 | .419 | .872 |
| 3 | .136 | 12.59 | 72.02 | .451 | .824 |
| 4 | .071 | 9.61 | 26.64 | .433 | .851 |
| 5 | .147 | 14.10 | 76.89 | .466 | .801 |
| 6 | .144 | 13.59 | 91.17 | .433 | .851 |
| 7 | .114 | 11.92 | 71.73 | .406 | .891 |
| 8 | .086 | 10.02 | 29.11 | .464 | .804 |
|  |  |  | Average | <.439> | <.842> |

What is claimed is:

1. A method of converting a dielectric permittivity well log representing a record of measurements of dielectric permittivity made on a formation as a function of depth in a borehole at a frequency of less than about 100 MHz to a water saturation log of the formation as a function of depth in the borehole, comprising:

saturating a sample of the formation with brine having a resistivity similar to the resistivity of the formation brine;

measuring the dielectric permittivity of the brine saturated sample at a plurality of frequencies greater than about 100 MHz;

extrapolating the measurements made on the brine saturated sample to determine the dielectric permittivity of the formation at the frequency of the dielectric log made on the formation at less than about 100 MHz; and converting the dielectric permittivity log made on the formation as a function of depth at less than about 100 MHz and the dielectric permittivity of the formation as determined by extrapolating the measurements made on the brine saturated sample to a water saturation log of the formation as a function of depth using an interpretation algorithm.

2. The method of claim 1 wherein the dielectric permittivity measurements are extrapolated based on the following formulas for a real and an imaginary part of dielectric permittivity, wherein the real part of dielectric permittivity $\text{Re}\epsilon^*(\omega)$ is represented by:

$$\text{Re}\epsilon^*(\omega) = \epsilon'(\infty) + \frac{\Delta\epsilon'_{IP}}{1 + \left(\frac{\omega}{\omega_{IP}}\right)^2}$$

and wherein the imaginary part of dielectric permittivity $\text{Im}\epsilon^*(\omega)$ is represented by:

$$\text{Im}\epsilon^*(\omega) = \epsilon''(\infty) + \frac{\sigma}{\omega} + \frac{(\Delta\epsilon'_{IP})\left(\frac{\omega}{\omega_{IP}}\right)}{1 + \left(\frac{\omega}{\omega_{IP}}\right)^2}$$

wherein:

$\epsilon'(\infty)$=Real part of dielectric permittivity at infinite frequency $\Delta\epsilon_{IP}'$=Change in real part of dielectric permittivity due to interfacial or dipole relaxation $\omega$=Angular frequency in radians/second ($2\pi f$)

$\omega_{IP}$=Characteristic angular frequency for interfacial polarization or dipole relaxation $\sigma$=Frequency independent D.C. conductivity.

3. The method of claim 1 wherein:

the following interpretation algorithm is used for producing the water saturation logs:

$$S_w = \left[\frac{\left(\frac{\epsilon^*(\omega) - \epsilon_m}{\epsilon_w^* - \epsilon_m}\right)\left(\frac{\epsilon_w^*}{\epsilon^*(\omega)}\right)^L}{\phi_t}\right]^{1/k}$$

wherein:

$S_w$=Water saturation $\epsilon^*(\omega)$=Frequency Dependence of Dielectric permittivity of the formation $\epsilon_m$=Dielectric permittivity of rock matrix $\epsilon_w^*$=Dielectric permittivity of saturating brine L=Depolarization factor k=Functional formation parameter $\phi_t$=Total porosity.

4. A method of converting a dielectric permittivity well log representing a record of measurements of dielectric permittivity made on a formation as a function of depth in a borehole at a frequency of less than about 100 MHz and a total porosity log made on the formation as a function of depth in a borehole to a total oil log of the formation as a function of depth in a borehole, comprising:

saturating a sample of the formation with brine having a resistivity similar to the resistivity of the formation brine;

measuring the dielectric permittivity of the brine saturated sample at a plurality of frequencies greater than about 100 MHz;

extrapolating the measurements made on the brine saturated sample to determine the dielectric permittivity of the formation at the frequency of the dielectric log made on the formation at less than about 100 MHz;

converting the dielectric log made on the formation as a function of depth at less than about 100 MHz and the dielectric permittivity of the formation as determined by extrapolating the measurement made on the brine saturated sample to a water saturation log of the formation as a function of depth using an interpretation algorithm; and then converting the total porosity log made on the formation as a function of depth and the water saturation log of the formation as a function of depth to a total oil log of the formation as a function of depth.

5. The method of claim 4 wherein the dielectric permittivity measurements are extrapolated based on the following formulas for a real and an imaginary part of dielectric permittivity, wherein the real part of the dielectric permittivity $Re\epsilon^*(\omega)$ is represented by:

$$Re\epsilon^*(\omega) = \epsilon'(\infty) + \frac{\Delta\epsilon'_{IP}}{1 + \left(\frac{\omega}{\omega_{IP}}\right)^2}$$

and wherein the imaginary part of dielectric permittivity $Im\epsilon^*(\omega)$ is represented by:

$$Im\epsilon^*(\omega) = \epsilon''(\infty) + \frac{\sigma}{\omega} + \frac{(\Delta\epsilon'_{IP})\left(\frac{\omega}{\omega_{IP}}\right)}{1 + \left(\frac{\omega}{\omega_{IP}}\right)^2}$$

wherein:

$\epsilon'(\omega)$ = Real part of dielectric permittivity at infinite frequency $\Delta\epsilon_{IP}'$ = Change in real part of dielectric permittivity due to interfacial or dipole relaxation $\omega$ = Angular frequency in radians/second ($2\pi f$)

$\omega_{IP}$ = Characteristic angular frequency for interfacial polarization or dipole relaxation $\sigma$ = Frequency independent D.C. conductivity.

6. The method of claim 4 wherein:

the following interpretation algorithm is used for producing the water saturation logs:

$$S_w = \left[\frac{\left(\frac{\epsilon^*(\omega) - \epsilon_m}{\epsilon_w^* - \epsilon_m}\right)\left(\frac{\epsilon_w^*}{\epsilon^*(\omega)}\right)^L}{\phi_t}\right]^{1/k}$$

wherein:

$S_w$ = Water saturation $\epsilon^*(\omega)$ = Frequency Dependence of Dielectric permittivity of the formation $\epsilon_m$ = Dielectric permittivity of rock matrix $\epsilon_w^*$ = Dielectric permittivity of saturating brine $L$ = Depolarization factor $k$ = Functional formation parameter $\phi_t$ = Total porosity.

7. A method of converting two dielectric permittivity well logs representing records of measurements of dielectric permittivity made on a formation as a function of depth at frequencies of less than and greater than 100 MHz and a total porosity well log of the formation as a function of depth into a moveable oil log of the formation as a function of depth, comprising:

saturating a sample of the formation with brine having a resistivity similar to the resistivity of the formation brine;

measuring the dielectric permittivity of the brine saturated sample at a plurality of frequencies greater than about 300 MHz, including the frequency of the dielectric log made on the formation at greater than 100 MHz;

extrapolating the measurements made on the brine saturated sample to determine the dielectric permittivity of the formation at the frequency of the dielectric log made on the formation at less than about 100 MHz;

converting the dielectric permittivity well log made on the formation as a function of depth at less than about 100 MHz and the dielectric permittivity of the formation as determined by extrapolating the measurements made on the brine saturated sample to a water saturation log of the formation as a function of depth using an interpretation algorithm;

converting the dielectric permittivity well log made on the formation as a function of depth of frequencies greater than about 100 MHz and the dielectric log measurement made on the brine saturated sample to a water saturation log of the formation as a function of depth using an interpretation algorithm;

wherein a single interpretation algorithm is used for producing the water saturation logs for the formation based on the dielectric permittivity well logs made on the formation as a function of depth at frequencies less than and greater than 100 MHz, the interpretation algorithm being effective for reflecting actual differences in formation saturations; and converting the total porosity well log made on the formation as a function of depth and the differences between the water saturation for the formation as shown on water saturation logs based on the dielectric permittivity well log made on the formation as a function of depth at frequencies less than and greater than about 100 MHz to a moveable oil log of the formation as a function of depth.

8. The method of claim 7 wherein the dielectric permittivity measurements are extrapolated based on the following formulas for a real and an imaginary part of dielectric permittivity, wherein the real part of dielectric permittivity $Re\epsilon^*(\omega)$ is represented by:

$$Re\epsilon^*(\omega) = \epsilon'(\infty) + \frac{\Delta\epsilon'_{IP}}{1 + \left(\frac{\omega}{\omega_{IP}}\right)^2}$$

and wherein the imaginary part of dielectric permittivity $Im\epsilon^*(\omega)$ is represented by:

$$Im\epsilon^*(\omega) = \epsilon''(\infty) + \frac{\sigma}{\omega} + \frac{(\Delta\epsilon'_{IP})\left(\frac{\omega}{\omega_{IP}}\right)}{1 + \left(\frac{\omega}{\omega_{IP}}\right)^2}$$

wherein:

$\epsilon'(\omega)$ = Real part of dielectric permittivity at infinite frequency $\Delta\epsilon_{IP}'$ = Change in real part of dielectric permittivity due to interfacial or dipole relaxation $\omega$ = Angular frequency in radians/second ($2\pi f$)

$\omega_{IP}$ = Characteristic angular frequency for interfacial polarization or dipole relaxation $\sigma$ = Frequency independent D.C. conductivity.

9. The method of claim 7 wherein:
the following interpretation algorithm is used for producing the water saturation logs:

$$S_w = \left[\frac{\left(\frac{\epsilon^*(\omega) - \epsilon_m}{\epsilon_w^* - \epsilon_m}\right)\left(\frac{\epsilon_w^*}{\epsilon^*(\omega)}\right)^L}{\phi_t}\right]^{1/k}$$

wherein:

$S_w$ = Water saturation $\epsilon^*(\omega)$ = Frequency Dependence of Dielectric permittivity of the formation $\epsilon_m$ = Dielectric permittivity of rock matrix $\epsilon_w^*$ = Dielectric permittivity of saturating brine L = Depolarization factor k = Functional formation parameter $\phi_t$ = Total porosity.

* * * * *

UNITED STATES PATENT AND TRADEMARK OFFICE
CERTIFICATE OF CORRECTION

PATENT NO. : 5,059,907

DATED : October 22, 1991

INVENTOR(S) : Michael M. Sherman

It is certified that error appears in the above--identified patent and that said Letters Patent is hereby corrected as shown below:

Column 9, line 49, "$\varepsilon'(\omega)$" should read --$\varepsilon'(\infty)$--.

Claim 7, Column 10, line 20, "300" should read --100--.

Claim 7, Column 10, line 36 "of frequenc-" should read --at frequenc----.

Claim 8, Column 11, line 12, "$\varepsilon'(\omega)$" should read --$\varepsilon'(\infty)$--.

Signed and Sealed this

Twenty-third Day of February, 1993

*Attest:*

STEPHEN G. KUNIN

*Attesting Officer*     Acting Commissioner of Patents and Trademarks